(12) United States Patent
Cao et al.

(10) Patent No.: US 11,698,564 B2
(45) Date of Patent: Jul. 11, 2023

(54) PHASE-SHIFT UNIT, PHASE SHIFTER AND ANTENNA

(71) Applicants: Beijing BOE Optoelectronics Technology Co., Ltd., Beijing (CN); BOE TECHNOLOGY GROUP CO., LTD., Beijing (CN)

(72) Inventors: Xue Cao, Beijing (CN); Junhui Wu, Beijing (CN); Ying Wang, Beijing (CN); Peizhi Cai, Beijing (CN); Zhifu Li, Beijing (CN); Lijun Mao, Beijing (CN); Jiaheng Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/649,708

(22) Filed: Feb. 2, 2022

(65) Prior Publication Data
US 2022/0158347 A1    May 19, 2022

Related U.S. Application Data

(63) Continuation of application No. 17/106,828, filed on Nov. 30, 2020, now Pat. No. 11,276,929, which is a (Continued)

(30) Foreign Application Priority Data

Jan. 24, 2017  (CN) .......................... 201710060025.4

(51) Int. Cl.
G02F 1/137    (2006.01)
G02F 1/1333    (2006.01)
(Continued)

(52) U.S. Cl.
CPC .... *G02F 1/13731* (2013.01); *G02F 1/133308* (2013.01); *G02F 1/133514* (2013.01);
(Continued)

(58) Field of Classification Search
None
See application file for complete search history.

(56) References Cited

U.S. PATENT DOCUMENTS 4,511,843 A * 4/1985 Thoraval .................. G01V 3/30
                                                      324/338
6,556,168 B1    4/2003 Marumoto et al.
(Continued)

FOREIGN PATENT DOCUMENTS

CN    1580909 A    2/2005
CN    101206330 A    6/2008
(Continued)

OTHER PUBLICATIONS

International Search Report and Written Opinion dated Sep. 27, 2017, for corresponding PCT Application No. PCT/CN2017/098043.
(Continued)

*Primary Examiner* — Ryan Crockett
(74) *Attorney, Agent, or Firm* — Kinney & Lange, P.A.

(57) ABSTRACT

A phase-shift unit includes: a first substrate and a second substrate provided opposite to each other; a medium layer provided between the first substrate and the second substrate; a microstrip line disposed at a side of the second substrate facing towards the first substrate; and a grounding layer provided at a side of the first substrate facing towards the second substrate and formed with a via hole; wherein a projection of the via hole onto the second substrate and a projection of the microstrip line onto the second substrate have an overlapped area therebetween; and wherein the via
(Continued)

hole is configured to feed a phase-shifted microwave signal out of the phase-shift unit, or feed a microwave signal into the phase-shift unit such that the microwave signal is phase-shifted.

15 Claims, 4 Drawing Sheets

Related U.S. Application Data continuation-in-part of application No. 15/750,810, filed as application No. PCT/CN2017/098043 on Aug. 18, 2017, now Pat. No. 10,884,308.

(51) Int. Cl.
| | |
|---|---|
| G02F 1/1335 | (2006.01) |
| G02F 1/1362 | (2006.01) |
| H01Q 1/38 | (2006.01) |
| H01Q 1/50 | (2006.01) |
| H01Q 3/36 | (2006.01) |
| H01Q 1/48 | (2006.01) |
| G02F 1/1339 | (2006.01) |

(52) U.S. Cl.
CPC ......... *G02F 1/136286* (2013.01); *H01Q 1/38* (2013.01); *H01Q 1/48* (2013.01); *H01Q 1/50* (2013.01); *H01Q 3/36* (2013.01); *G02F 1/1339* (2013.01); *G02F 1/133354* (2021.01)

(56) References Cited

U.S. PATENT DOCUMENTS

| | | | |
|---|---|---|---|
| 6,559,798 B1 | 5/2003 | Marumoto et al. | |
| 9,755,286 B2 | 9/2017 | Wang et al. | |
| 2009/0278744 A1 | 11/2009 | Kirino et al. | |
| 2010/0131023 A1 | 5/2010 | Costello et al. | |
| 2012/0242941 A1* | 9/2012 | Suwa | G02F 1/133707 |
| | | | 349/123 |
| 2013/0293425 A1 | 11/2013 | Zhu et al. | |
| 2015/0380789 A1* | 12/2015 | Jakoby | H01P 1/184 |
| | | | 343/905 |

FOREIGN PATENT DOCUMENTS

| | | | |
|---|---|---|---|
| CN | 105308789 A | | 2/2016 |
| CN | 105589269 A | | 5/2016 |
| CN | 106154603 A | | 11/2016 |
| CN | 106299627 A | * | 1/2017 |
| CN | 106684551 A | | 5/2017 |
| EP | 2768072 A1 | | 8/2014 |

OTHER PUBLICATIONS

First Chinese Office Action dated Oct. 8, 2018, for corresponding Chinese Application No. 201710060025.4.

\* cited by examiner

PHASE-SHIFT UNIT, PHASE SHIFTER AND ANTENNA

CROSS-REFERENCE TO RELATED APPLICATIONS

This application is a continuation application of U.S. patent application Ser. No. 17/106,828, filed Nov. 30, 2020, which in turn is a continuation-in-part of U.S. patent application Ser. No. 15/750,810, filed Feb. 6, 2018, which in turn is a 371 National Stage application of International Application No. PCT/CN2017/098043, with an international filing date of Aug. 18, 2017, which in turn claims priority to Chinese Patent Application No. 201710060025.4 filed on Jan. 24, 2017 in the State Intellectual Property Office of China, the disclosures of which are hereby incorporated by reference in their entirety.

TECHNICAL FIELD

The present disclosure relates to the technical field of display technology, and particularly, to a phase-shift unit, a phase shifter and an antenna.

BACKGROUND

In existing wireless terminals (such as mobile phone, tablet computer and the likes), a display panel and an antenna are two functional modules independently provided, and are required to be designed and manufactured respectively and finally be assembled. The process is relatively complicated. Moreover, almost of the antennas in the terminals are omnidirectional antennas which have high power consumption and thus affect duration performance to a large extent.

A smart antenna is an antenna array which is capable of determining spatial information of a microwave signal by means of intelligent algorithm to achieve tracing and location of microwave signal source. By means of tracing and filtering of microwave signal, strength of microwave signal can be greatly improved, proportion of microwave signal interruption can be reduced, and energy loss can be reduced.

SUMMARY

According to an aspect of embodiments of the present disclosure, there is provided a phase-shift unit comprising:

a first substrate and a second substrate provided opposite to each other;

a medium layer provided between the first substrate and the second substrate;

a microstrip line disposed at a side of the second substrate facing towards the first substrate; and a grounding layer provided at a side of the first substrate facing towards the second substrate and formed with a via hole;

wherein a projection of the via hole onto the second substrate and a projection of the microstrip line onto the second substrate have an overlapped area therebetween; and the via hole is configured to feed a phase-shifted microwave signal out of the phase-shift unit, or feed a microwave signal into the phase-shift unit such that the microwave signal is phase-shifted.

In some embodiments, the projection of the microstrip line onto the second substrate divides the projection of the via hole onto the second substrate into portions located on two sides of the projection of the microstrip line onto the second substrate.

In some embodiments, the portions of the projection of the via hole onto the second substrate located on the two sides of the projection of the microstrip line onto the second substrate are symmetrical about the projection of the microstrip line onto the second substrate.

In some embodiments, the projection of the microstrip line onto the second substrate spans and exceeds an extension of the projection of the via hole onto the second substrate.

In some embodiments, the microstrip line includes a first portion extending in a winding shape on the second substrate, and a second portion electrically connected to the first portion, the projection of the via hole onto the second substrate overlaps a projection of the second portion onto the second substrate, and no overlap is between a projection of the first portion onto the second substrate and the projection of the via hole onto the second substrate.

In some embodiments, the phase-shift unit further comprises: a direct-current blocking device provided at a feeder interface of the microstrip line and configured for avoiding interference of direct current signal.

In some embodiments, the phase-shift unit further comprises:

a first alignment layer and a second alignment layer provided at either side of the liquid crystal layer, respectively.

In some embodiments, the first alignment layer is provided between the liquid crystal layer and the grounding layer; and the second alignment layer is provided between the liquid crystal layer and a film layer where the microstrip line is located.

In some embodiments, a projection of one end of the microstrip line onto the second substrate is located within the projection of the via hole onto the second substrate.

In some embodiments, buffer layers are provided between the second substrate and the microstrip line, and between the first substrate and the grounding layer, respectively.

According to another aspect of embodiment of the present disclosure, there is provided a phase shifter, comprising at least one said phase-shift unit.

In some embodiments, the phase shifter comprises a plurality of said phase-shift units, wherein the plurality of phase-shift units have the common first substrate and the common second substrate.

According to another aspect of embodiments of the present disclosure, there is provided an antenna comprising at least one said phase shifter of claim 11.

In some embodiments, the antenna further comprises:

at least one patch unit provided at a side of the first substrate facing away from the liquid crystal layer and configured to transmit or receive an electromagnetic wave signal, and a projection of the at least one via hole onto the second substrate is located within a projection of the at least one patch unit onto the second substrate.

In some embodiments, the projection of at least one patch unit onto the second substrate and the projection of at least one microstrip line onto the second substrate have an overlapped area therebetween.

In some embodiments, the antenna comprises four via holes in an array arrangement, and the antenna comprises patch units being in a one-to-one positional correspondence to the four via holes, and wherein a projection of the patch unit onto the first substrate at least covers a projection of the via hole onto the first substrate.

BRIEF DESCRIPTION OF THE DRAWINGS

FIG. 10(a) shows a phase-shift unit of the antenna shown in FIG. 10(b).

DETAILED DESCRIPTION OF THE EMBODIMENTS

In order to provide a more clear understanding of objects, technique solutions and advantages of the present disclosure, the present disclosure will be further described hereinafter in detail with reference to the attached drawings. Obviously, the described embodiments are only some of embodiments of the present disclosure, instead of all of the embodiments of the present disclosure. For those skilled in the art, all other embodiments achieved by referring to the embodiments of the present disclosure without involving any inventive steps fall into the scope of the present disclosure.

Figure 1:
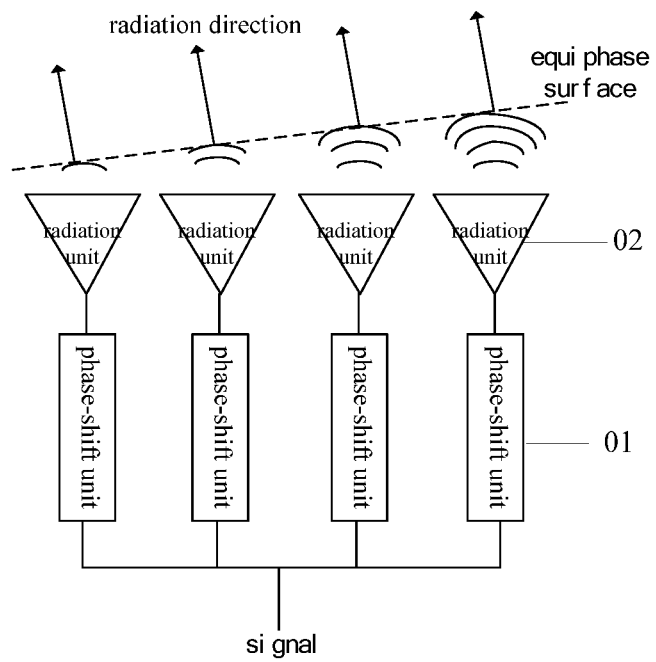
FIG. 1 is a structural schematic view showing a smart antenna provided in related art.

Phased-array antenna is a smart antenna which achieves adjustment of beam direction by controlling a feed phase of a microwave signal. Referring to FIG. 1, after a microwave signal enters a phase-shift unit 01 through a feed network, phase shift capability of each phase-shift unit 01 is adjusted so that the microwave signal arriving at each radiation unit 02 can generate a corresponding phase difference, equiphase surface deflects, and also radiation direction varies accordingly. As a result, radiation directional pattern of the microwave signal can be controlled as long as a phase shift amount of the phase-shift unit 01 is adjusted, which achieves real-time tracing of the microwave signal.

The phase-shift unit, the phase shifter and the antenna provided according to embodiments of the present disclosure use liquid crystals as a transmission medium of an electromagnetic wave signal (taking a microwave signal as an example) and achieves phase control of the microwave signal by deflection of the liquid crystals. Moreover, the phase-shift unit provided according to embodiments of the present disclosure has good compatibility with a display panel.

Shapes and sizes of components in the attached drawings do not reflect actual scale, and only intend to schematically illustrate contents of the present disclosure.

Figure 2:
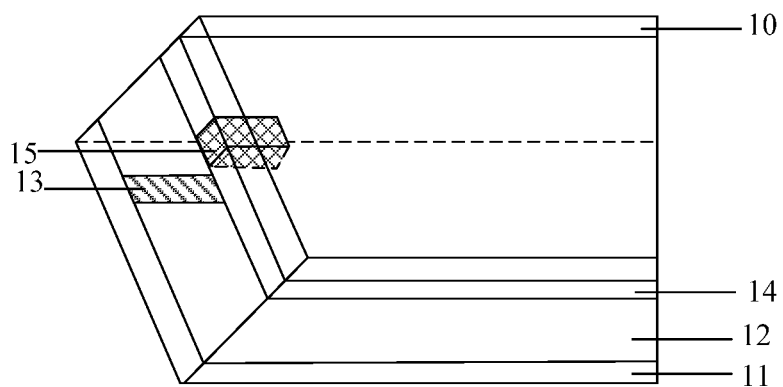
FIG. 2 is a perspective schematic view showing a phase-shift unit according to an embodiment of the present disclosure.
Figure 3A:
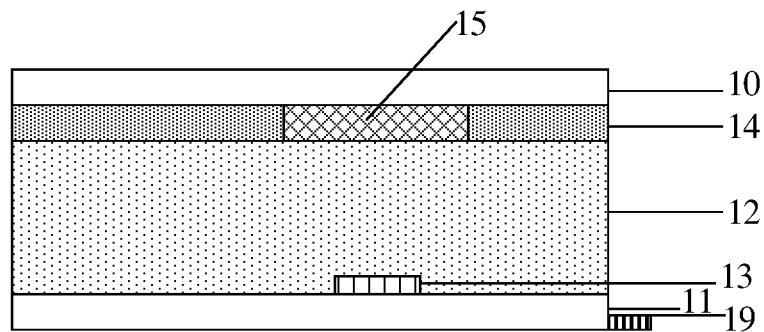
FIG. 3(a) and FIG. 3(b) are sectional schematic views showing the phase-shift unit of FIG. 2, respectively.
Figure 3B:
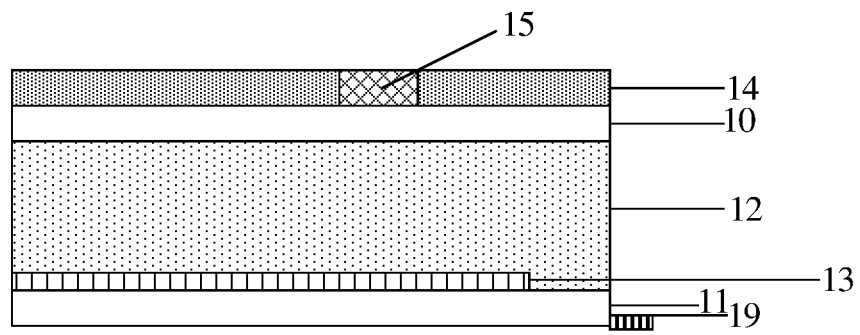

Referring to FIG. 2, FIG. 3(a) and FIG. 3(b), a phase-shift unit provided according to one embodiment of the present disclosure includes: a first substrate 10 and a second substrate 11 assembled to each other; a liquid crystal layer 12 provided between the first substrate 10 and the second substrate 11; a microstrip line 13 provided at a side of the second substrate 11 facing towards the liquid crystal layer 12, and configured for receiving a voltage signal that controls deflection of liquid crystal molecules in the liquid crystal layer and for receiving or transmitting a microwave signal; and a grounding layer 14 provided on the first substrate 10 and including a via hole 15 corresponding to the microstrip line 13. In examples, as shown in FIG. 3(a), the grounding layer 14 is provided at a side of the first substrate facing towards the liquid crystal layer 12, or as shown in FIG. 3(b), the grounding layer 14 is provided at a side of the first substrate away from the liquid crystal layer 12.

Here, FIG. 2 is a perspective schematic view of a phase-shift; and FIG. 3(a) and FIG. 3(b) are sectional schematic views of the phase-shift unit, respectively. In FIG. 2, FIG. 3(a) and FIG. 3(b), only one microstrip line and one via hole are taken as an example, and it is not limited to this structure; and the phase-shift unit may further comprise a plurality of microstrip lines and a plurality of via holes and similar structures, and it is not specifically limited herein.

As shown in the figures, a phase-shift unit comprises: a first substrate and a second substrate provided opposite to each other; a medium layer provided between the first substrate and the second substrate; a microstrip line provided at a side of the second substrate facing towards the first substrate; and a grounding layer provided at a side of the first substrate facing towards the second substrate and formed with a via hole; wherein a projection of the via hole onto the second substrate and a projection of the microstrip line onto the second substrate have an overlapped area therebetween; and the via hole is configured to feed a phase-shifted microwave signal out of the phase-shift unit, or feed a microwave signal into the phase-shift unit such that the microwave signal is phase-shifted.

Specifically, liquid crystal molecule as anisotropic material owns different dielectric constants in its long axis direction and its short axis direction. The liquid crystal molecule deflects while being applied with a deflection voltage at both ends of the liquid crystal molecule, and dielectric constant of the liquid crystal molecule also varies according to the deflection of the liquid crystal. If the liquid crystal is acted as a transmission media of transmitting a microwave signal, when the microwave signal is transmitting in the liquid crystal with varied dielectric constants, phase of the microwave signal changes accordingly, namely a phase shift occurs. Accordingly, in the embodiments of the present disclosure, phase of the microwave signal is controlled by varying dielectric constants of the liquid crystal molecules. When receiving or transmitting the microwave signal, the liquid crystal layer is deflected under the action of a voltage difference between the microstrip line and the grounding layer, and adjusts the phase of the microwave signal passing through the liquid crystal layer.

A phase-shift unit provided according to embodiments of the present disclosure includes: a first substrate and a second substrate assembled to each other; a liquid crystal layer between the first substrate and the second substrate; a microstrip line provided at a side of the second substrate facing towards the liquid crystal layer, and configured for receiving a voltage signal that controls deflection of liquid crystal molecules in the liquid crystal layer and for receiving or transmitting a microwave signal; and a grounding layer provided on the first substrate and including a via hole corresponding to the microstrip line. As a result, according to embodiments of the present disclosure, the liquid crystal layer is provided between the microstrip line and the grounding layer and is deflected under a voltage difference between the microstrip line and the grounding layer. When the microwave signal propagates in the deflected liquid crystal layer, phase of the microwave signal varies according to deflection of the liquid crystal layer, and the microwave signal is further transmitted through the via hole of the grounding layer. Therefore, the phase-shift unit according to embodiments of the present disclosure achieves use of liquid crystals as transmission media of the microwave signal and controlling of phase of the microwave signal according to the deflection of the liquid crystals. Moreover, the phase-shift unit provided according to embodiments of the present disclosure has good compatibility with a display panel.

In some embodiments, referring to FIG. 3(a), in the phase-shift unit provided according to embodiments of the present disclosure, the grounding layer 14 is provided at a side of the first substrate 10 facing towards the liquid crystal layer 12, so that the microwave signal directly radiates through the via hole after passing through the deflected liquid crystal layer.

In some specific embodiments, in the phase-shift unit provided according to embodiments of the present disclosure, referring to FIG. 3(a) and FIG. 3(b), a projection of the via hole 15 of the grounding layer 14 onto the second substrate 11 and a projection of the microstrip line 13 onto the second substrate 11 have an overlapped area therebetween. In particular, the microstrip line 13 corresponds in position to the via hole 15 of the grounding layer, and, after transmitting in the liquid crystal layer as media, the microwave signal in the microstrip line 13 is transmitted to a radiation unit through the via hole 15. Accordingly, in order to further couple the microwave signal in the microstrip line to the via hole, the projection of the via hole 15 and the projection of the microstrip line 13, onto the first substrate 10 or the second substrate 11, are overlapped, so that the microstrip line couples the microwave signal to the via hole of the grounding layer in a minimum distance in a vertical direction.

As shown in the figures, the projection of the microstrip line onto the second substrate divides the projection of the via hole onto the second substrate into portions located on two sides of the projection of the microstrip line onto the second substrate.

As shown in the figures, the portions of the projection of the via hole onto the second substrate located on the two sides of the projection of the microstrip line onto the second substrate are symmetrical about the projection of the microstrip line onto the second substrate.

It can also be contemplated that the projection of the microstrip line onto the second substrate spans and exceeds an extension of the projection of the via hole onto the second substrate.

The microstrip line includes a first portion extending in a winding shape on the second substrate, and a second portion electrically connected to the first portion, the projection of the via hole onto the second substrate overlaps a projection of the second portion onto the second substrate, and no overlap is between a projection of the first portion onto the second substrate and the projection of the via hole onto the second substrate.

It can also be contemplated that a projection of one end of the microstrip line onto the second substrate is located within the projection of the via hole onto the second substrate.

Figure 4:
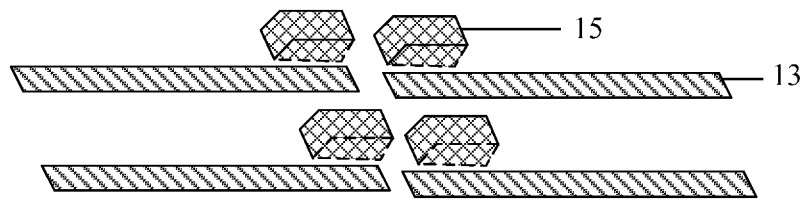
FIG. 4 is a perspective schematic view showing another phase-shift unit according to the embodiment of the present disclosure.

In some specific embodiments, in the phase-shift unit provided according to embodiments of the present disclosure, referring to FIG. 4, one end of the microstrip line 13 corresponds to the via hole. In particular, when the phase-shift unit comprises four via holes, the four via holes correspond to four microstrip lines. For example, one end of each microstrip line 13 corresponds to one via hole. Referring to FIG. 4, the four via holes are in an array arrangement, and one end of each of the four microstrip lines 13 corresponds in position to one via hole.

Figure 5:
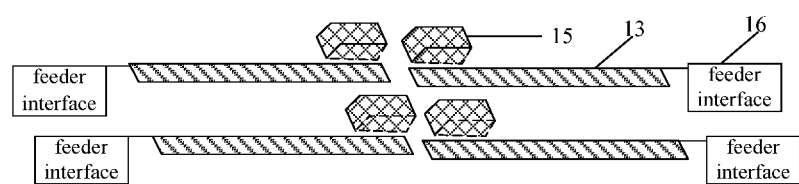
FIG. 5 is a perspective schematic view showing a yet another phase-shift unit according to the embodiment of the present disclosure.

In some specific embodiments, in the phase-shift unit provided according to embodiments of the present disclosure, referring to FIG. 5, the other end of the microstrip line 13 is connected to a feeder interface 16 configured for feeding a microwave signal from an electrical cable into the microstrip line, or for feeding the microwave signal from the microstrip line into the electromagnet cable. In particular, a plurality of microstrip lines are connected to one feeder interface, or each microstrip line is connected to a different feeder interface. In a specific implementation, the microwave signals having same phase can be input at a plurality of feeder interfaces, or are input at one feeder interface. Because different voltage microwave signals may be applied onto the microstrip line, difference occurs in deflection of different liquid crystals in the microstrip line, to generate a phase difference in the microwave signal passing through each via hole. When a plurality of microstrip lines are connected to one feeder interface, in order to prevent one microstrip line from interrupting other microstrip lines when the one microstrip line is feeded with a microwave signal or a voltage signal at the feeder interface, in some embodiments, a direct-current blocking device is mounted at the feeder interface of the microstrip line, for blocking a direct-current signal interruption.

In specific embodiments, in the above phase-shift unit provided according to embodiments of the present disclosure, the phase-shift unit further comprises: a control unit 19 configured for transmitting the voltage signal that controls deflection of liquid crystal molecules in the liquid crystal layer. At least one of the microstrip lines 13 is connected to the control unit through a lead wire made of a transparent conductive material such as ITO and IZO, and the grounding layer is grounded. In particular, in order to control deflection of the liquid crystals, it requires to apply a voltage signal between the microstrip line and the grounding layer, accordingly, the control unit 19 is used for controlling a voltage difference between the microstrip line and the grounding layer when the liquid crystals of the liquid crystal layer are deflected. Moreover, in order to keep a good contact between the microstrip line and the control unit, the microstrip line 13 can be manufactured as a lead wire configured for connection to the control unit. Each of the microstrip lines 13 is connected to a lead wire respectively and there is a one-to-one correspondence between the lead wires and the microstrip lines 13. The control unit may be a driver IC. Specifically, in order for further controlling the voltage difference between the microstrip line and the grounding layer, the grounding layer is grounded and is only used for controlling a voltage applied to the microstrip line.

Figure 6:
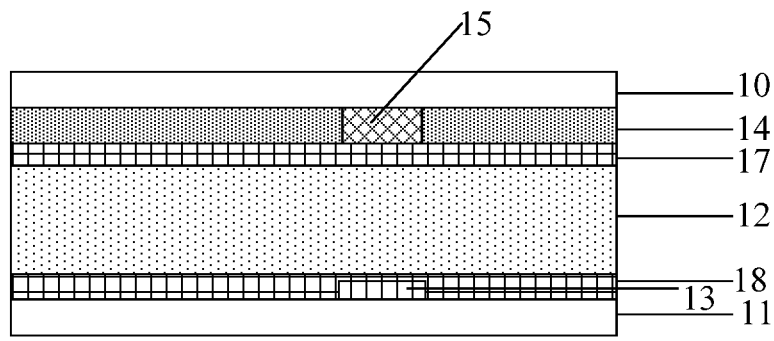
FIG. 6 is a sectional schematic view showing a still another phase-shift unit according to the embodiment of the present disclosure.

In specific embodiments, in the above phase-shift unit provided according to embodiments of the present disclosure, referring to FIG. 6, the phase-shift unit further comprises: a first alignment layer 17 and a second alignment layer 18 provided at either side of the liquid crystal layer 12, respectively.

Figure 7:
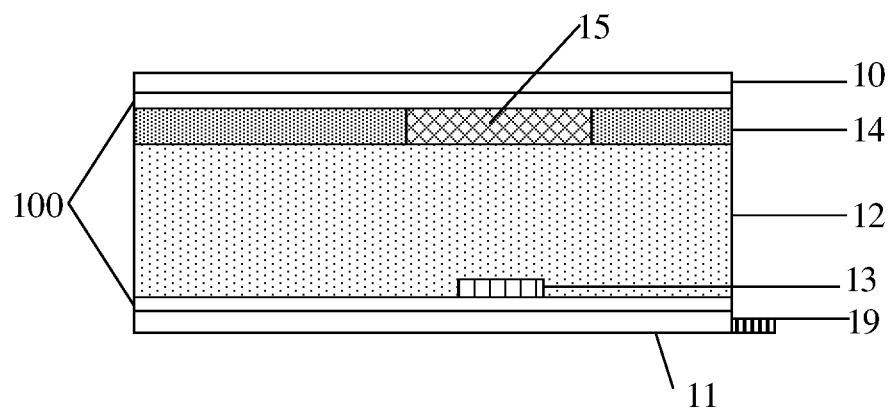
FIG. 7 is a schematic sectional view showing a further phase-shift unit according to the embodiment of the present disclosure.

In specific embodiments, in the phase-shift unit according to the embodiments of the present disclosure, referring to FIG. 7, buffer layers 100 are provided between the second substrate and the microstrip line, and between the first substrate and the grounding layer, respectively, and are configured to avoid a rupture of the first substrate and the second substrate caused by a stress concentration when a metal is deposited. Generally, the material of the buffer layer is SiNx, and the buffer layer has a thickness of 50 μm-500 μm.

Referring to FIG. 6, the first alignment layer 17 is provided between the liquid crystal layer 12 and the grounding layer 14; and the second alignment layer 18 is provided between the liquid crystal layer 12 and a film layer where the microstrip line 13 is located. In particular, the liquid crystal molecules of the liquid crystal layer have long axes and short axes, and the liquid crystal molecules are not deflected when no voltage difference exists between the microstrip line 13 and the grounding layer 14. In order to align orientations of the liquid crystal molecules so that long axes of the liquid crystal molecules are provided in parallel between the first substrate 10 and the second substrate 12, it needs to provide the first alignment layer 17 and the second alignment layer 18 to arrange an arrangement of orientations of the liquid crystal molecules.

It should be note that, both the microstrip line and the grounding layer according to embodiments of the present disclosure are metal layers having electrical conductivity. In formation of the grounding layer or the microstrip line on the first substrate or the second substrate, a manner of deposition, such as processes including sputtering, evaporation or electric plating, or other processes can be used.

The phase-shift unit provided according to embodiments of the present disclosure includes the liquid crystal layer, the first alignment layer and the second alignment layer provided at either side of the liquid crystal layer, respectively, the grounding layer provided at the side of the first alignment layer facing away from the second alignment layer, and the microstrip line provided at the side of the second alignment layer facing away from the first alignment layer. The liquid crystal layer is deflected under the action of the voltage difference between the microstrip line and the grounding layer, a corresponding deflection occurs in the phase of the microwave signal passing through the liquid crystal layer, thereby achieving the object of controlling the phase of the microwave signal by controlling the liquid crystal layer. The phase-shift unit provided according to embodiments of the present disclosure can achieve controlling of the phase of the microwave signal at any angles.

According to another embodiment, there is provided a phase shifter comprising at least one phase-shift unit as described above.

In an embodiment, the phase shifter comprises a plurality of phase-shift units 01. In an embodiment, the plurality of phase-shift units 01 have the common first substrate 10 and the common second substrate 11.

According to another embodiment of the present disclosure, there is provided an antenna comprising at least one phase shifter units according to the abovementioned embodiment. In an embodiment, in order to achieve transmission and receipt of the antenna at multiple angles by means of the phase-shift unit, each antenna comprises at least two phase shifter, to achieve transmission or receipt of the microwave signal at any angle.

Figure 8:
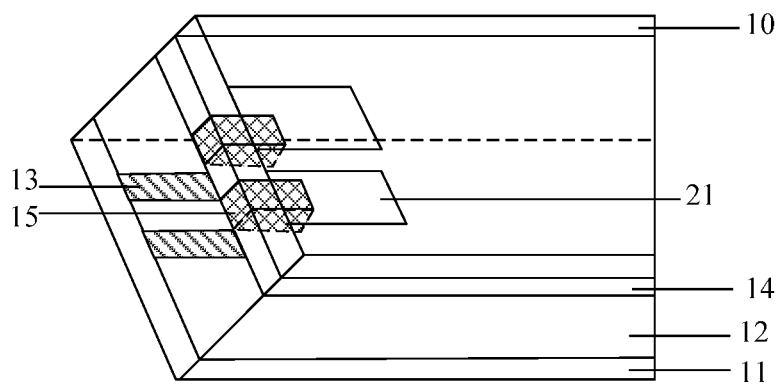
FIG. 8 is a structural schematic view showing an antenna according to an embodiment of the present disclosure.

Based on the same inventive concept, according to embodiments of the present disclosure, there is also provided an antenna comprising at least two phase-shift units according to the abovementioned embodiment, referring to FIG. 7 and FIG. 8. In an embodiment, the grounding layer 14 is provided at a side of the first substrate 10 facing towards the liquid crystal layer 12, and the antenna further comprises: at least two patch units 21 provided at a side of the first substrate 10 facing away from the liquid crystal layer 12 and configured for transmitting or receiving the microwave signal, the patch units 21 are in a one-to-one positional correspondence to the via holes 15 in the grounding layer 14, and a projection of each via hole 15 onto the first substrate 10 is located within a projection of the patch unit 21 corresponding to the via hole 15 onto the first substrate.

Specifically, with the antenna provided according to embodiments of the present disclosure, after the phase of the microwave signal is adjusted by the phase-shift unit, the microwave signal is coupled with the patch unit having radiation function through the via hole, and the microwave signal having a varied phase is transmitted at a fixed angle through the patch unit. Conversely, the patch unit feedbacks the microwave signal received at the fixed angle to the phase-shift unit through the via hole. Therefore, the antenna provided according to embodiments of the present disclosure achieves transmission of the microwave signal at a fixed angle, reduces noise interruption, and improves utilization ratio of power of the microwave signal.

In one embodiment, the number of the patch units and the number of the via holes are identical, and positions of the patch units on the first substrate are in a one-to-one correspondence to positions of the via holes. In some embodiments, each antenna comprises four via holes in an array arrangement, and comprises patch units being in a one-to-one correspondence to the four via holes. In order to enable the microwave signal passing through the via holes to be coupled to the patch unit in a better manner, a projection of the patch unit onto the first substrate at least covers a projection of the via hole onto the first substrate.

As shown in the figures, a projection of the at least one via hole onto the second substrate is located within a projection of the at least one patch unit onto the second substrate.

As shown in the figures, the projection of the patch unit onto the second substrate and the projection of the microstrip line onto the second substrate have an overlapped area therebetween.

The antenna provided according to embodiments of the present disclosure comprises the phase-shift unit provided according to embodiments of the present disclosure, accordingly, the antenna provided according to embodiments of the present disclosure achieves phrase controlling by means of deflection of the liquid crystal layer, and thus changes the direction of the microwave signal radiated by the antenna.

According to specified embodiments, in the antenna provided according to embodiments of the present disclosure, the patch unit has a rectangular or circular shape. In particular, the patch unit may have any shape such as a triangular shape and a trapezoidal shape and is not specified limited herein.

Figure 9:
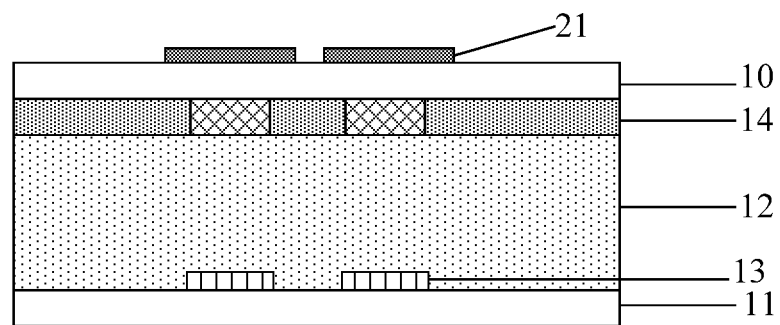
FIG. 9 is another sectional schematic view showing the antenna of FIG. 8.

Based on the same inventive concept, according to a yet another embodiment of the present disclosure, there is also provided a display panel. Referring to FIG. 9, the display panel includes a display region A and a frame region B. In the frame region of the display panel, at least one set of the abovementioned antenna 30 according to any of the embodiments of the present disclosure is included. In one embodiment, FIG. 9 shows only that the antenna is provided at an upper frame of the display panel, however, the present disclosure is not limited to this.

Specifically, the antenna is provided in the frame region of the display panel, and the antenna comprises the liquid crystal layer. When the display panel also comprises a liquid crystal layer, in order to prevent the liquid crystal layer in the frame region from interrupting the liquid crystal layer in the display region, the liquid crystal layers in the display region and in the frame region are sealed respectively by adhesives. In addition, the antenna is provided in the frame region of the display panel, including at any frame, where no printed circuit board (IC/FPC) is provided, of the frame region, and each display panel includes one antenna or a plurality of antennas, and it is not specifically limited herein.

In the frame region of the display panel provided according to embodiments of the present disclosure, the antenna provided according to embodiments of the present disclosure is included. Since the antenna provided according to embodiments of the present disclosure in structure includes the first substrate, the second substrate, and the liquid crystal layer provided between the first substrate and the second substrate, structure of the antenna provided according to embodiments of the present disclosure can be manufactured together with the display panel, and thus the antenna has good compatibility.

Figure 10A:
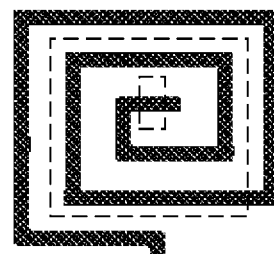
FIG. 10(a) and FIG. 10(b) are schematic top views showing an antenna according to an embodiment of the present disclosure.
Figure 10B:
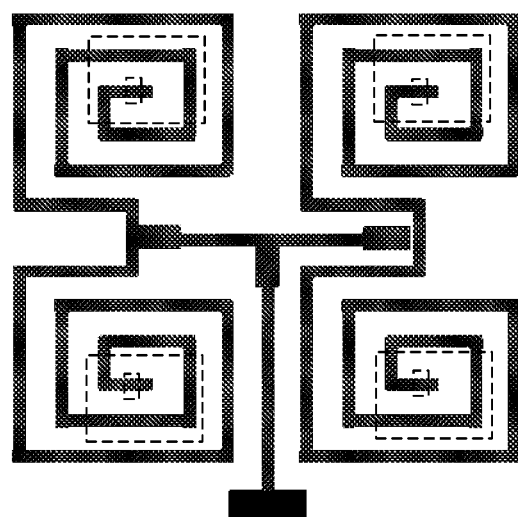

In specific embodiments, in the abovementioned display panel provided according to embodiments of the present disclosure, the antenna is provided at an upper frame, a left frame and/or a right frame of the display panel. In particular, referring to FIG. 10, the display panel further comprises a printed circuit board 31, and the printed circuit board 31 is provided at the lower frame of the display panel. When the display panel comprises a plurality of antenna 30, the plurality of antenna may be provided at the upper frame, the left frame and/or the right frame. FIG. 10 only shows an example in which the display panel comprises two antenna 30. Structure of each antenna is the same as that of the antenna according to the another embodiment of the present disclosure. Moreover, there may be a plurality of patch units and microstrip lines in each antenna, so that the object of receiving or transmitting the microwave signal at 360° can be achieved. For example, referring to FIG. 11, the microstrip line 13 of the antenna 30 is provided in the same layer as a gate layer 41 of the display region, and the grounding layer 14 of the antenna 30 is provided in the same layer as a common electrode layer 42 of the display region A. For another example, in an embodiment not shown, the microstrip line 13 of the antenna 30 may be provided in the same layer as a source-drain layer 43 of the display region A, and the grounding layer 14 of the antenna 30 is provided still in the same layer as the common electrode layer 42 of the display region A.

In specific embodiments, in the abovementioned display panel provided according to embodiments of the present disclosure, the first substrate is a color filter substrate and the second substrate is an array substrate; or, the first substrate is an array substrate and the second substrate is a color filter substrate. In particular, the microstrip line of the antenna is provided in the frame region of the array substrate, and the grounding layer and the patch unit are provided at either side of the frame region of the color film substrate, respectively; or, the microstrip line of the antenna is provided in the frame region of the color filter substrate, and the grounding layer and the patch unit are provided at either side of the frame region of the array substrate, respectively; or, when the display panel comprises at least two antenna, in one antenna, the microstrip line is provided in the frame region of the array substrate, and the grounding layer and the patch unit are provided at either side of the frame region of the color filter substrate, respectively; while, in the other antenna, the microstrip line is provided in the frame region of the color film substrate, and the grounding layer and the patch unit are provided at either side of the frame region of the array substrate, respectively.

The display panel according to embodiments of the present disclosure is a liquid crystal display panel, the antenna controls the phase of the microwave signal by means of deflection of liquid crystal molecules in the liquid crystal layer, and the antenna can be manufactured together with the display panel and thus has a better compatibility.

Based on the same inventive concept, according to a still another embodiment of the present disclosure, there is also provided a display device comprising any one of the abovementioned display panels provided according to the embodiments of the present disclosure. The display device may be any products or components having a display function, including a mobile phone, a tablet computer, a television, a display, a notebook computer, a digital photo frame, a navigator and the like. Implementations of the display device can refer to the abovementioned embodiments of the array substrate, and the description is not repeated for the sake of brevity.

Concerning the above, the phase-shift unit provided according to the one embodiment of the present disclosure comprises a first substrate and a second substrate assembled to each other; a liquid crystal layer between the first substrate and the second substrate; a microstrip line provided at a side of the second substrate facing towards the liquid crystal layer, and configured for receiving a voltage signal that controls deflection of liquid crystal molecules in the liquid crystal layer and for receiving or transmitting a microwave signal; and a grounding layer provided on the first substrate and including a via hole corresponding to the microstrip line. As a result, according to embodiments of the present disclosure, the liquid crystal layer is provided between the microstrip line and the grounding layer and will be deflected under a voltage difference between the microstrip line and the grounding layer. When the microwave signal propagates in the deflected liquid crystal layer, the phase of the microwave signal varies according to deflection of the liquid crystal layer, and the microwave signal is further transmitted through the via hole of the grounding layer. Therefore, the phase-shift unit according to embodiments of the present disclosure achieves use of liquid crystals as transmission media of the microwave signal and controlling of phase of the microwave signal according to the deflection of the liquid crystals. Moreover, the phase-shift unit provided according to embodiments of the present disclosure has good compatibility with a display panel.

The another embodiment of the present disclosure provides an antenna. The antenna provided according to the another embodiment of the present disclosure comprises the phase-shift unit of the one embodiment of the present disclosure, and the patch unit coupled to the via hole of the phase-shift unit. The microwave signal is radiated through the patch unit. Therefore, the antenna provided according to the embodiments of the present disclosure can be provided in the display panel, and thus has a good compatibility with the display panel.

Obviously, those skilled in the art may make any changes and modifications to the present disclosure without departing from the principles and spirit of the disclosure. Thus, the present disclosure intends to include these changes and modifications to the present disclosure if they fall into the scope of the present disclosure defined in the claims and their equivalents.

The above specific embodiments are further description of objects, technique solutions and advantages of the present invention. It should be understood that, the above described contents are merely specific embodiments of the present invention, but not intended to limit the present disclosure. Any changes, equivalent alternatives, modifications, made within principles and spirit of the present disclosure, should be included within the scope of the present disclosure.

What is claimed is:

1. A phase-shift unit, comprising:
a first substrate and a second substrate provided opposite to each other;
a liquid crystal layer provided between the first substrate and the second substrate;
a microstrip line disposed at a side of the second substrate facing towards the first substrate, and configured to receive or transmit a microwave signal; and
a grounding layer provided at a side of the first substrate facing towards the second substrate and formed with a via hole;
wherein a projection of the via hole onto the second substrate and a projection of the microstrip line onto the second substrate have an overlapped area therebetween;
wherein the liquid crystal layer is configured to shift a phase of the microwave signal to be received by the microstrip line or of the microwave signal transmitted by the microstrip line by changing a phase velocity of the microwave signal;
wherein the via hole is configured to feed the microwave signal that has been phase-shifted out of the phase-shift unit, or feed the microwave signal to be received by the microstrip line into the phase-shift unit such that the microwave signal is phase-shifted; and
wherein the projection of the microstrip line onto the second substrate divides the projection of the via hole onto the second substrate into two portions symmetrical about the projection of the microstrip line onto the second substrate.

2. The phase-shift unit of claim 1, wherein the microstrip line extends continuously on the second substrate.

3. The phase-shift unit of claim 1, wherein the grounding layer is continuous except the via hole.

4. The phase-shift unit of claim 1, wherein both the microstrip line and the grounding layer are metal layers.

5. The phase-shift unit of claim 1, wherein the projection of the microstrip line onto the second substrate spans and exceeds the projection of the via hole onto the second substrate.

6. The phase-shift unit of claim 1, wherein the microstrip line comprises a first portion extending in a winding shape on the second substrate, and a second portion electrically connected to the first portion, the projection of the via hole onto the second substrate overlaps a projection of the second portion onto the second substrate, and no overlap is between a projection of the first portion onto the second substrate and the projection of the via hole onto the second substrate.

7. The phase-shift unit of claim 1, further comprising:
a first alignment layer and a second alignment layer provided at opposite sides of the liquid crystal layer, respectively.

8. The phase-shift unit of claim 7, wherein:
the first alignment layer is provided between the liquid crystal layer and the grounding layer; and
the second alignment layer is provided between the liquid crystal layer and a film layer where the microstrip line is located.

9. The phase-shift unit of claim 1, wherein buffer layers are provided between the second substrate and the microstrip line, and between the first substrate and the grounding layer, respectively.

10. A phase shifter, comprising at least one said phase-shift unit of claim 1.

11. The phase shifter of claim 10, comprising a plurality of said phase-shift units, wherein the plurality of phase-shift units have the first substrate and the second substrate in common.

12. An antenna, comprising at least one said phase shifter of claim 10.

13. The antenna of claim 12, wherein:
the antenna further comprises at least one patch unit provided at a side of the first substrate facing away from the liquid crystal layer and configured to transmit or receive an electromagnetic wave signal; and
a projection of the at least one via hole onto the second substrate is located within a projection of the at least one patch unit onto the second substrate.

14. The antenna of claim 13, wherein the projection of at least one patch unit onto the second substrate and the projection of the first portion of at least one microstrip line onto the second substrate have an overlapped area therebetween.

15. The antenna of claim 12, wherein the antenna comprises four via holes in an array arrangement, and the antenna comprises patch units being in a one-to-one positional correspondence to the four via holes, and wherein a projection of the patch unit onto the first substrate at least covers a projection of the via hole onto the first substrate.

* * * * *